United States Patent
Kurokawa et al.

(10) Patent No.: US 10,373,776 B2
(45) Date of Patent: Aug. 6, 2019

(54) SWITCH DEVICE INCLUDING DUAL ON/OFF SIGNAL GENERATION UNITS, AND NUMERICAL CONTROL SYSTEM

(71) Applicant: FANUC CORPORATION, Minamitsuru-gun, Yamanashi (JP)

(72) Inventors: Yuuki Kurokawa, Yamanashi (JP); Yoshiyuki Kubo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/207,598

(22) Filed: Dec. 3, 2018

(65) Prior Publication Data

US 2019/0180957 A1    Jun. 13, 2019

(30) Foreign Application Priority Data

Dec. 8, 2017 (JP) ................................. 2017-235949

(51) Int. Cl.
| | |
|---|---|
| *H01H 9/16* | (2006.01) |
| *H01H 13/64* | (2006.01) |
| *H01H 13/70* | (2006.01) |
| *G05B 19/414* | (2006.01) |
| *H01H 13/14* | (2006.01) |

(52) U.S. Cl.
CPC ............ *H01H 13/64* (2013.01); *G05B 19/414* (2013.01); *H01H 9/16* (2013.01); *H01H 13/14* (2013.01); *H01H 13/70* (2013.01)

(58) Field of Classification Search
CPC .......... H01H 13/64; H01H 13/14; H01H 9/16; H01H 13/70; G05B 19/414
See application file for complete search history.

(56) References Cited

U.S. PATENT DOCUMENTS 4,631,722 A * 12/1986 Voss .......................... F16P 3/20
700/4

FOREIGN PATENT DOCUMENTS

JP            11-161326 A        6/1999

\* cited by examiner

*Primary Examiner* — Daniel J Cavallari
(74) *Attorney, Agent, or Firm* — RatnerPrestia (57) ABSTRACT

A switch device includes a switch operation unit, two detection units which convert the amount of press of the switch operation unit into detection signals, determination units which determine the pressed state of the switch operation unit, monitoring units which monitor the determination states of the determination units, and output units, each of which outputs an ON signal when the determination unit determines that a full pressed state is maintained, and when, upon determination that a half pressed state is maintained, the detection signal is equal to or larger than an ON threshold and the monitoring result indicates a full pressed state, and outputs an OFF signal when the determination unit determines that a non-pressed state is maintained, and when, upon determination that a half pressed state is maintained, the detection signal is equal to or smaller than an OFF threshold and the monitoring result indicates a non-pressed state.

5 Claims, 7 Drawing Sheets

SWITCH DEVICE INCLUDING DUAL ON/OFF SIGNAL GENERATION UNITS, AND NUMERICAL CONTROL SYSTEM

CROSS-REFERENCE TO RELATED APPLICATION

This application is a new U.S. Patent Application that claims benefit of Japanese Patent Application No. 2017-235949, filed Dec. 8, 2017, the disclosure of this application is being incorporated herein by reference in its entirety for all purposes.

BACKGROUND OF THE INVENTION

1. Field of the Invention

The present invention relates to a switch device including dual ON/OFF signal generation units, and a numerical control system.

2. Description of the Related Art

In a machine tool, a CNC (Computerized Numerical Control) device (to be simply referred to as a "numerical control device" hereinafter) is generally used for movement control of a tool and the like. To monitor the safety of the machine tool, safety input signals generated by a switch device are dualized and input to the numerical control device, and the safety function of the machine tool is monitored based on the result of comparison between the states of these two safety input signals. A press button switch in the switch device includes two contact points, and a first output signal and a second output signal indicating "high" or "low" output upon pressing of these contact points are input to the numerical control device as a first safety input signal and a second safety input signal, respectively. The numerical control device compares the states of the first safety input signal and the second safety input signal with each other and determines that the safety function of the machine tool controlled by the numerical control device has deteriorated (i.e., is abnormal) when these two safety input signals do not match each other.

As disclosed in, e.g., Japanese Unexamined Patent Publication (Kokai) No. H11-161326, a numerical control device is known to include a plurality of independent reception means for receiving external signals, and a monitoring means for comparing the external signals received by at least two reception means of the plurality of reception means and monitoring the reception means, based on the comparison result.

SUMMARY OF INVENTION

When the safety input signals are dualized using the press button switch, the time (to be referred to as the "response time" hereinafter) taken after the contact points are pressed until the numerical control device receives the first safety input signal and the second safety input signal varies depending on characteristics unique to each contact point and each signal line connected to this contact point. In other words, even when the machine tool is normal, since the states of the two safety input signals received by the numerical control device do not match each other in a certain time zone, the numerical control device may erroneously determine that "the machine tool is abnormal" because of such a mismatch between the safety input signals. Therefore, to prevent such erroneous determination, a time (to be referred to as a "permissible time" hereinafter) in which the mismatch between the safety input signals is permissible is set in safety monitoring processing of the numerical control device. However, depending on the structure of the press button switch, the difference in response time between the dual safety input signals may be too large to exceed the permissible time, and the numerical control device may erroneously determine that the safety function has deteriorated.

It is, therefore, desired to provide a switch device which generates a safety input signal to be input to a numerical control device to accurately monitor the safety function of a machine tool, and a numerical control system including the same.

According to one aspect of the present disclosure, a switch device includes a press operation type switch operation unit, two detection units configured to convert an amount of press of the switch operation unit into electrical detection signals and output the detection signals, and two ON/OFF signal generation units provided in correspondence with the respective detection units, each of the ON/OFF signal generation units including a determination unit configured to determine whether the switch operation unit is in a full pressed state, a half pressed state, or a non-pressed state, based on the detection signal output from the detection unit corresponding to the each of the ON/OFF signal generation units, a monitoring unit configured to monitor a pressed state determined by the determination unit in the ON/OFF signal generation unit different from the each of the ON/OFF signal generation units, and an output unit which outputs one of an ON signal and an OFF signal, wherein each of the output units outputs the ON signal in a case where the determination unit in the ON/OFF signal generation unit equipped with the each of the output units determines that the full pressed state is maintained, and in a case where, when the determination unit in the ON/OFF signal generation unit equipped with the each of the output units determines that the half pressed state is maintained, the detection signal output from the detection unit corresponding to the ON/OFF signal generation unit equipped with the each of the output units is not less than an ON threshold and a monitoring result obtained by the monitoring unit indicates the full pressed state, and outputs the OFF signal in a case where the determination unit in the ON/OFF signal generation unit equipped with the each of the output units determines that the non-pressed state is maintained, and in a case where, when the determination unit in the ON/OFF signal generation unit equipped with the each of the output units determines that the half pressed state is maintained, the detection signal output from the detection unit corresponding to the ON/OFF signal generation unit equipped with the each of the output units is not more than an OFF threshold and a monitoring result obtained by the monitoring unit indicates the non-pressed state.

In addition, according to one aspect of the present disclosure, a numerical control system includes the above-described switch device, and a numerical control device configured to receive, as safety input signals for monitoring a safety function of a machine tool, an ON signal and an OFF signal output from the output unit of each of the two ON/OFF signal generation units, the numerical control device including a comparison unit configured to compare the two safety input signals input from the respective ON/OFF signal generation units, and a safety monitoring unit configured to determine, as a result of comparison by the comparison unit, that the machine tool is normal when both of the two safety input signals are one of the ON signal and the OFF signal, and that the machine tool is abnormal when one of the two safety input signals is the ON signal and the other of the two safety input signals is the OFF signal.

BRIEF DESCRIPTION OF THE DRAWINGS

The present invention will be more clearly understood with reference to the following accompanying drawings.

DETAILED DESCRIPTION

Figure 9:
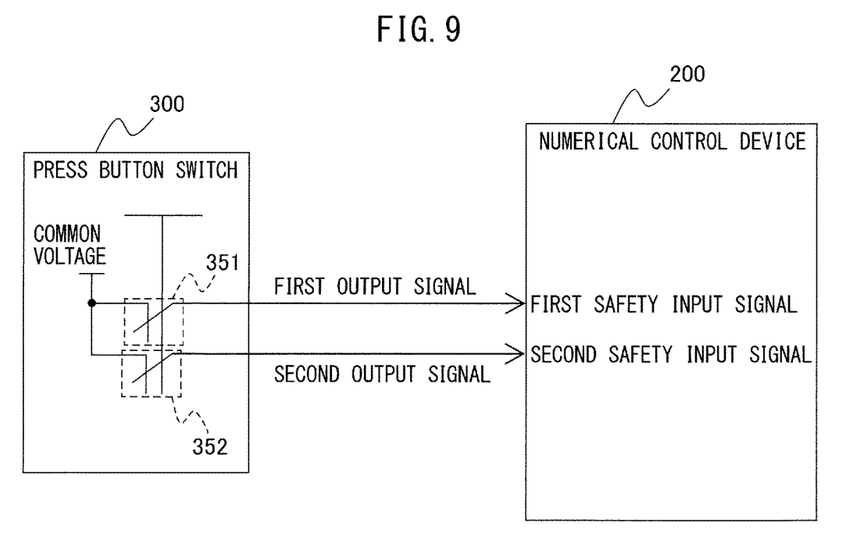
FIG. 9 is a diagram for explaining a conventional technique regarding safety monitoring of a machine tool based on safety input signals generated by a press button switch.
Figure 10:
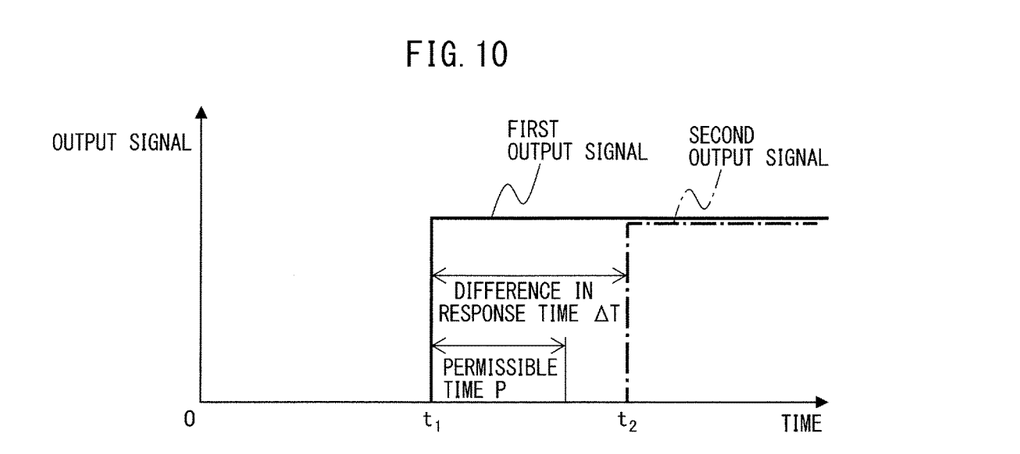
FIG. 10 is a chart illustrating an exemplary difference in response time between the safety input signals generated by the press button switch illustrated in FIG. 9.

Before a description of a switch device including dual ON/OFF signal generation units, and a numerical control system according to an embodiment of the present disclosure, a conventional technique regarding safety monitoring of a machine tool will be briefly described below with reference to FIGS. 9 and 10. FIG. 9 is a diagram for explaining a conventional technique regarding safety monitoring of a machine tool based on safety input signals generated by a press button switch. FIG. 10 is a chart illustrating an exemplary difference in response time between the safety input signals generated by the press button switch illustrated in FIG. 9. As illustrated in FIG. 9, two contact points 351 and 352 are provided in a press button switch 300, and a first output signal and a second output signal indicating "high" or "low" output upon pressing of these contact points are input to a numerical control device 200 as a first safety input signal and a second safety input signal, respectively. The numerical control device 200 compares the states of the first safety input signal and the second safety input signal with each other and determines that the safety function of the machine tool controlled by the numerical control device 200 has deteriorated (i.e., is abnormal) when these two safety input signals do not match each other. Depending on characteristics unique to each of the contact points 351 and 352 and each signal line, as illustrated in, e.g., FIG. 10, a difference in response time $\Delta T$ ($t_2-t_1$) occurs when, upon pressing of the press button switch 300 at time 0, the numerical control device 200 receives, at time $t_1$, the first safety input signal transmitted from the contact point 351 and receives, at time $t_2$, the second safety input signal transmitted from the contact point 352. Depending on the structure of the press button switch 300, the difference in response time $\Delta T$ between the dual safety input signals may be too large to exceed a permissible time P, and in this case, the numerical control device 200 erroneously determines that the safety function has deteriorated.

A switch device including dual ON/OFF signal generation units, and a numerical control system according to an embodiment of the present disclosure can prevent such erroneous determination. A switch device including dual ON/OFF signal generation units, and a numerical control system according to an embodiment of the present disclosure will be described below with reference to the drawings. These drawings use different scales as appropriate to facilitate an understanding. The mode illustrated in each drawing is one example for carrying out the present invention, and the present invention is not limited to the embodiments illustrated in these drawings.

Figure 1:
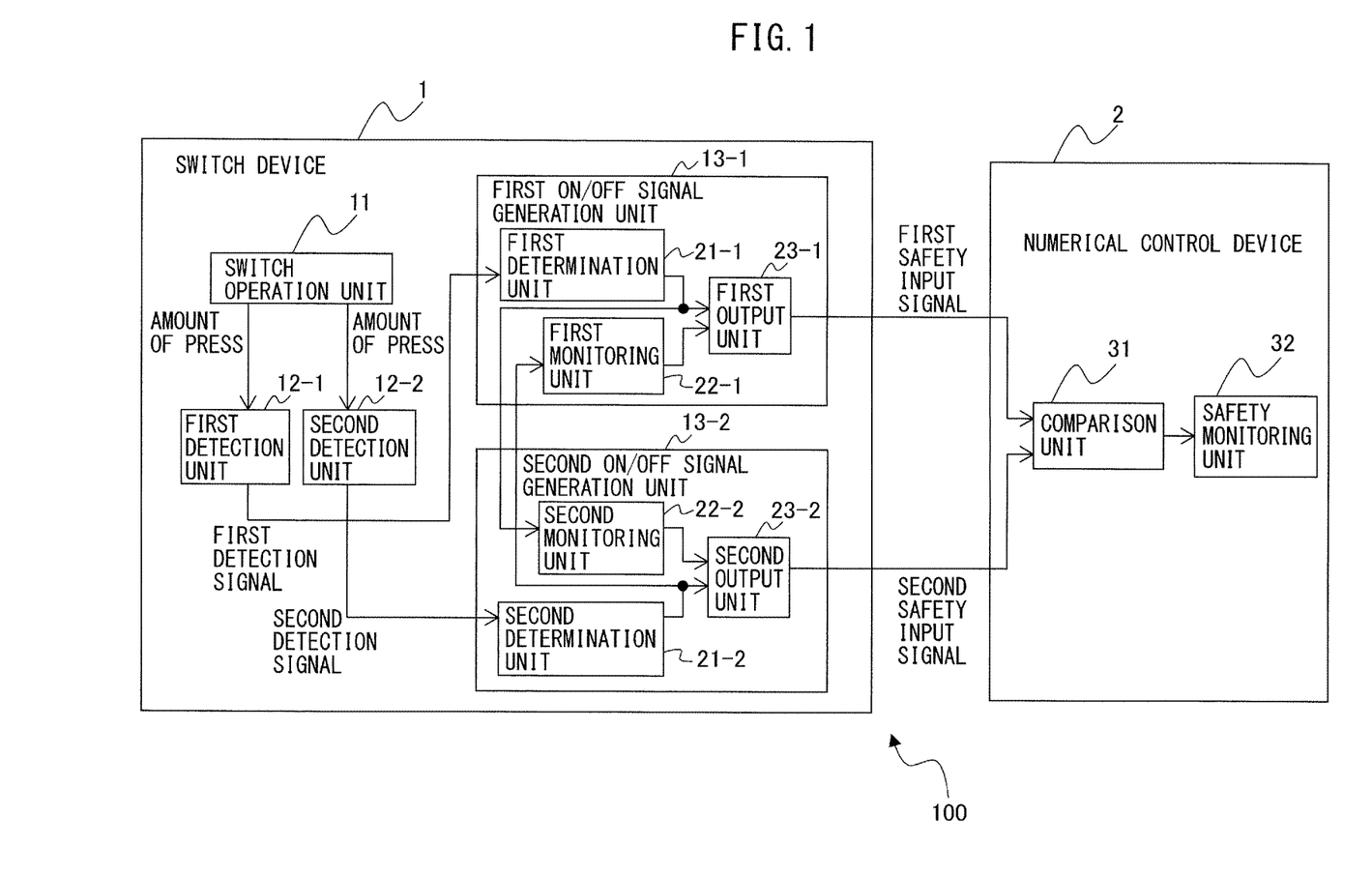
FIG. 1 is a block diagram illustrating a switch device and a numerical control system according to an embodiment of the present disclosure.
Figure 2:
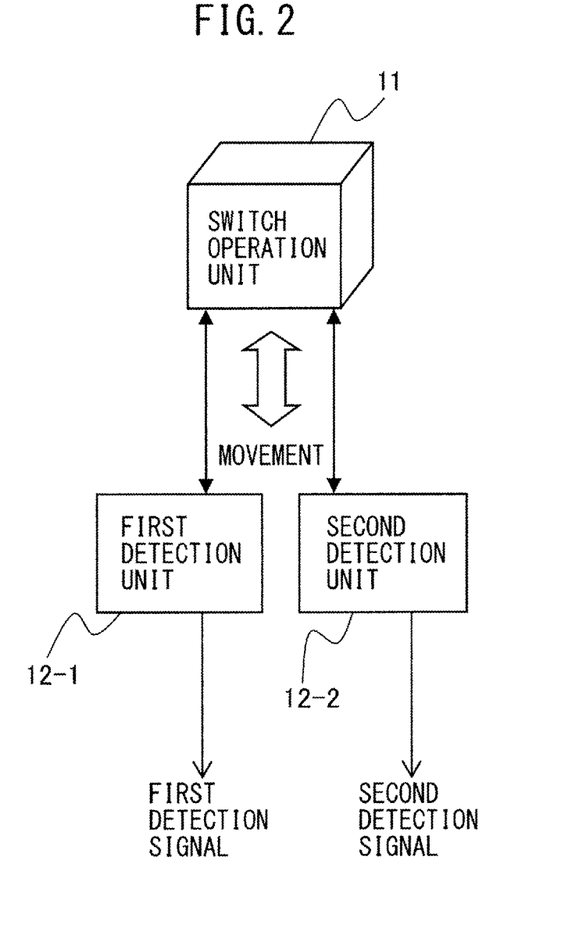
FIG. 2 is a schematic diagram illustrating the relationship between an operation unit and a set of a first detection unit and a second detection unit.

FIG. 1 is a block diagram illustrating a switch device and a numerical control system according to an embodiment of the present disclosure. FIG. 2 is a schematic diagram illustrating the relationship between an operation unit and a set of a first detection unit and a second detection unit.

According to the embodiment of the present invention, a numerical control system 100 includes a switch device 1 and a numerical control device 2. A machine tool body controlled by the numerical control system 100 is not illustrated in the drawings.

The numerical control device 2 receives, as safety input signals for monitoring the safety function of a machine tool, ON signals and OFF signals output from an output unit 23-1 of a first ON/OFF signal generation unit 13-1 and an output unit 23-2 of a second ON/OFF signal generation unit 13-2 in the switch device 1 (to be described later). The numerical control device 2 includes a comparison unit 31 and a safety monitoring unit 32. The comparison unit 31 compares a first safety input signal output from the first ON/OFF signal generation unit 13-1 and a second safety input signal output from the second ON/OFF signal generation unit 13-2 in the switch device 1 with each other. The safety monitoring unit 32 determines, as a result of comparison by the comparison unit 31, that the machine tool is normal when both the first safety input signal and the second safety input signal are an ON signal or an OFF signal (i.e., when the first safety input signal and the second safety input signal match each other). The safety monitoring unit 32 determines, as a result of comparison by the comparison unit 31, that the machine tool is abnormal when one of the first safety input signal and the second safety input signal is an ON signal and the other of the first safety input signal and the second safety input signal is an OFF signal (i.e., when the first safety input signal and the second safety input signal do not match each other).

The switch device 1 includes a switch operation unit 11, a first detection unit 12-1, a second detection unit 12-2, a first ON/OFF signal generation unit 13-1, and a second ON/OFF signal generation unit 13-2.

Only one switch operation unit 11 is provided in the switch device 1. The switch operation unit 11 is implemented as a press operation type switch including a structure movable in one direction in accordance with a press operation. The first detection unit 12-1 and the second detection unit 12-2 are placed on nearly extensions of the direction in which the switch operation unit 11 moves and are spaced apart from the switch operation unit 11 by a given distance and.

The first detection unit 12-1 detects the amount of press of the switch operation unit 11, converts this amount of press into an electrical, first detection signal, and outputs the first detection signal to the first ON/OFF signal generation unit 13-1. The second detection unit 12-2 detects the amount of press of the switch operation unit 11 (e.g., the distance between the switch operation unit 11 and the second detection unit 12-2), converts this amount of press into an electrical, second detection signal, and outputs the second detection signal to the second ON/OFF signal generation unit 13-2. The first detection unit 12-1 and the second detection unit 12-2 are implemented as proximity sensors which perform noncontact detection of their distances from the switch operation unit 11 serving as an object to be detected. Examples of the proximity sensors include magnetic, inductive, capacitive, ultrasonic, and photoelectric proximity sensors, but the type of proximity sensor itself does not particularly limit this embodiment, and any type of proximity sensor may be employed. Depending on the type of proximity sensor, the amounts of press of the switch operation unit 11 detected by the first detection unit 12-1 and the second detection unit 12-2 are defined by, e.g., the distance between the switch operation unit 11 and each detection unit, the press force acting on the switch operation unit 11, the electrostatic capacitance between the switch operation unit 11 and each detection unit, the strength of the magnetic field between the switch operation unit 11 and each detection unit, and the amount of light detected from the switch operation unit 11 by each detection unit.

The first ON/OFF signal generation unit 13-1 and the second ON/OFF signal generation unit 13-2 are provided in correspondence with the first detection unit 12-1 and the second detection unit 12-2, respectively.

The first ON/OFF signal generation unit 13-1 includes a first determination unit 21-1, a first monitoring unit 22-1, and a first output unit 23-1. The second ON/OFF signal generation unit 13-2 includes a second determination unit 21-2, a second monitoring unit 22-2, and a second output unit 23-2.

The first determination unit 21-1 determines whether the switch operation unit 11 is in a full pressed state, a half pressed state, or a non-pressed state, based on a first detection signal output from the first detection unit 12-1 corresponding to the first ON/OFF signal generation unit 13-1 equipped with the first determination unit 21-1. The second determination unit 21-2 determines whether the switch operation unit 11 is in a full pressed state, a half pressed state, or a non-pressed state, based on a second detection signal output from the second detection unit 12-2 corresponding to the second ON/OFF signal generation unit 13-2 equipped with the second determination unit 21-2. Although details will be described later, the "half pressed state" of the switch operation unit 11 means the pressed state of the press operation type switch operation unit 11 when a detection signal having an intermediate magnitude between a detection signal output from the first detection unit 12-1 or the second detection unit 12-2 upon full pressing (firm pressing) of the switch operation unit 11 by, e.g., an operator's finger and a detection signal output from the first detection unit 12-1 or the second detection unit 12-2 in the non-pressed (completely unpressed) state is output. Examples of the "half pressed state" may include the state in which the switch operation unit 11 is pressed to the extent that the operator suddenly touches it with his or her finger, and that in which the operator "half-presses" the switch operation unit 11 halfway with his or her finger.

Figure 3:
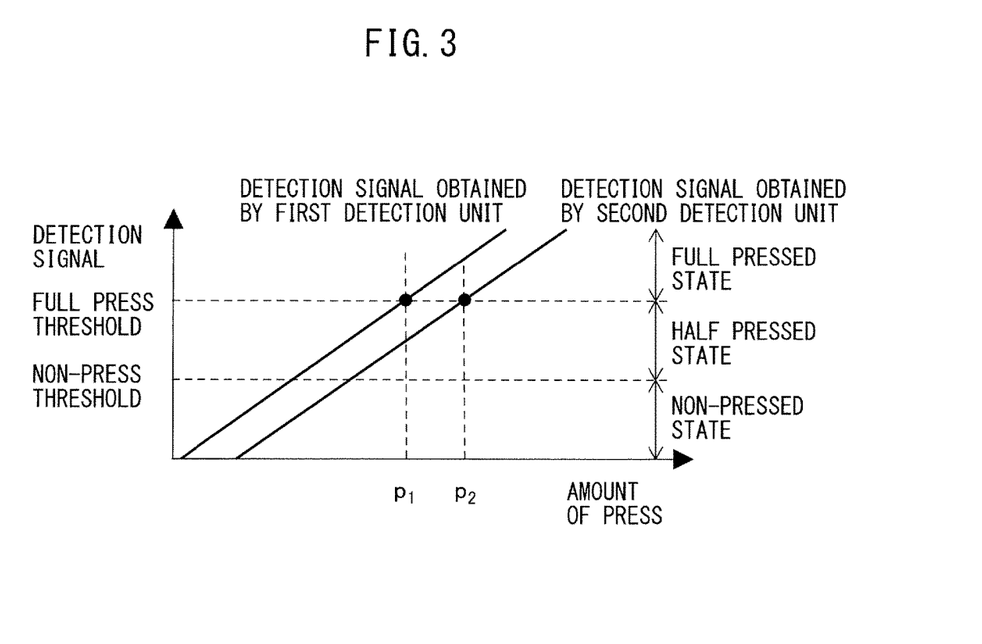
FIG. 3 is a graph for explaining determination processing for the pressed state of a switch operation unit by a first determination unit and a second determination unit.
Figure 4:
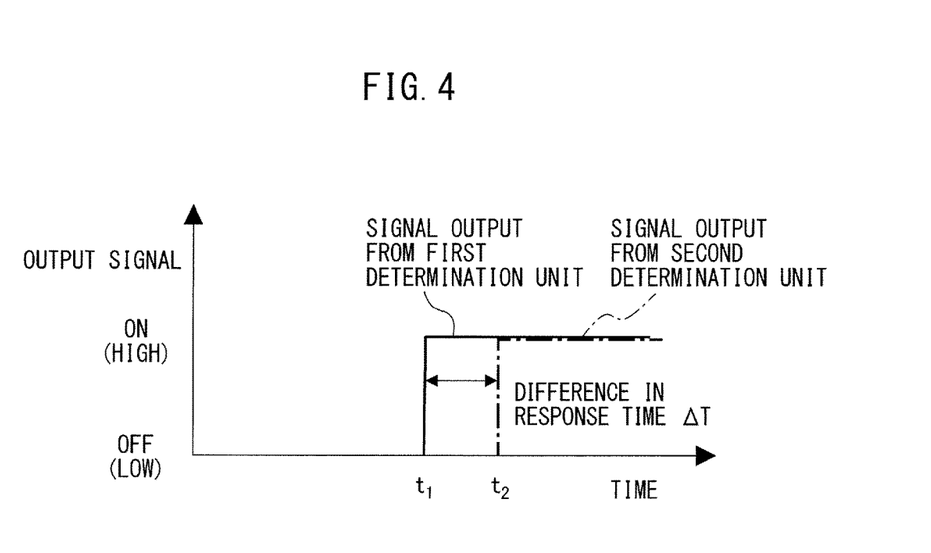
FIG. 4 is a chart illustrating an exemplary difference in response time between the first determination unit and the second determination unit.

FIG. 3 is a graph for explaining determination processing for the pressed state of a switch operation unit by a first determination unit and a second determination unit. FIG. 4 is a chart illustrating an exemplary difference in response time between the first determination unit and the second determination unit.

As thresholds used to determine, by the first determination unit 21-1 and the second determination unit 21-2, whether a full pressed state, a half pressed state, or a non-pressed state is maintained, a full press threshold and a non-press threshold smaller than the full press threshold are set. The first determination unit 21-1 determines that the full pressed state is maintained when the magnitude (amplitude) of a first detection signal output from the first detection unit 12-1 corresponding to the first ON/OFF signal generation unit 13-1 equipped with the first determination unit 21-1 is equal to or larger than a certain full press threshold, that the non-pressed state is maintained when this magnitude is equal to or smaller than a certain non-press threshold, and that the half pressed state is maintained when this magnitude is smaller than the full press threshold and larger than the non-press threshold. Similarly, the second determination unit 21-2 determines that the full pressed state is maintained when the magnitude (amplitude) of a second detection signal output from the second detection unit 12-2 corresponding to the second ON/OFF signal generation unit 13-2 equipped with the second determination unit 21-2 is equal to or larger than a certain full press threshold, that the non-pressed state is maintained when this magnitude is equal to or smaller than a certain non-press threshold, and that the half pressed state is maintained when this magnitude is smaller than the full press threshold and larger than the non-press threshold.

The first detection signal output from the first detection unit 12-1 and the second detection signal output from the second detection unit 12-2 correspond to the amount of press for the switch operation unit 11 detected by the first detection unit 12-1 and that for the switch operation unit 11 detected by the second detection unit 12-2 (e.g., the distance between the switch operation unit 11 and the first detection unit 12-1 and that between the switch operation unit 11 and the second detection unit 12-2), respectively, and, therefore, an increasing function describing increasing detection signal level tends to be obtained as the amount of press for the switch operation unit 11 gets larger (e.g., each of the above-mentioned distances gets smaller). Note, however, that the first detection signal output from the first detection unit 12-1 and the second detection signal output from the second detection unit 12-2 may be different from each other, as illustrated in FIG. 3, due to factors associated with the structure of the switch operation unit 11, or the differences in characteristic between the first detection unit 12-1 and the second detection unit 12-2, and the structural differences between the respective detection units in the switch device 1, such as the difference between the distance between the switch operation unit 11 and the first detection unit 12-1 and the distance between the switch operation unit 11 and the second detection unit 12-2. When it is determined whether the switch operation unit 11 is in a full pressed state by comparing the first detection signal output from the first detection unit 12-1 and the second detection signal output from the second detection unit 12-2 with the same full press threshold, a signal output as a result of determination processing by the first determination unit 21-1 and a signal output as a result of determination processing by the second determination unit 21-2 differ in their "output start timing" and have a difference in response time between them, as illustrated in FIG. 4. This occurs because the influence of the structure of the switch operation unit 11 or the structural differences between the respective detection units in the switch device 1, as described above, is reflected on each response time. For example, as illustrated in FIG. 3, at the same full press threshold, the first determination unit 21-1 determines that the full pressed state is maintained for an amount of press $p_1$ of the switch operation unit 11, and the second determination unit 21-2 determines that the full pressed state is maintained for an amount of press $p_2$ of the switch operation unit 11. As a result, as illustrated in FIG. 4, an ON signal (high) is output from the first determination unit 21-1 at time $t_1$, and an ON signal (high) is output from the second determination unit 21-2 at time $t_3$. When such signals output from the first determination unit 21-1 and the second determination unit 21-2 are used as safety input signals for monitoring the safety function of a machine tool, the difference in response time ΔT that is the time for which the safety input signals do not match each other is "$t_2-t_1$," as illustrated in FIG. 4. When the difference in response time ΔT exceeds the permissible time P, the numerical control device 2 erroneously determines that "the machine tool is abnormal," despite the fact that the machine tool is normal. Under the circumstances, in this embodiment, any given ON/OFF signal generation unit includes, in addition to the determination unit, a monitoring unit which monitors a pressed state determined by the determination unit in the ON/OFF signal generation unit different from the given ON/OFF signal generation unit, and an output unit which outputs an ON signal and an OFF signal in accordance with the determination result obtained by the determination unit, the monitoring result obtained by the monitoring unit, and the magnitude of the detection signal obtained by each detection unit. More specific details are as follows.

The first monitoring unit 22-1 in the first ON/OFF signal generation unit 13-1 monitors the pressed state of the switch operation unit 11 determined by the second determination unit 21-2 in the second ON/OFF signal generation unit 13-2. The second monitoring unit 22-2 in the second ON/OFF signal generation unit 13-2 monitors the pressed state of the switch operation unit 11 determined by the first determination unit 21-1 in the first ON/OFF signal generation unit 13-1.

The first output unit 23-1 outputs one of an ON signal and an OFF signal in accordance with the determination result obtained by the first determination unit 21-1, the monitoring result obtained by the first monitoring unit 22-1, and the magnitude of the first detection signal obtained by the first detection unit 12-1. Similarly, the second output unit 23-2 outputs one of an ON signal and an OFF signal in accordance with the determination result obtained by the second determination unit 21-2, the monitoring result obtained by the second monitoring unit 22-2, and the magnitude of the second detection signal obtained by the second detection unit 12-2.

Any of the first output unit 23-1 and the second output unit 23-2 outputs an ON signal (high) when it is determined that the switch operation unit 11 is in a full pressed state, and outputs an OFF signal (low) when it is determined that the switch operation unit 11 is in a non-pressed state, by the determination processing of the determination unit in the ON/OFF signal generation unit equipped with this output unit.

When it is determined that the switch operation unit 11 is in a half pressed state by the determination processing of any determination unit, it is determined whether an ON signal or an OFF signal is to be output from the output unit in the ON/OFF signal generation unit equipped with this determination unit, in accordance with the monitoring result obtained by the monitoring unit in the ON/OFF signal generation unit equipped with this determination unit, and the magnitude of the detection signal obtained by the detection unit corresponding to this ON/OFF signal generation unit. More specific details are as follows.

Figure 5:
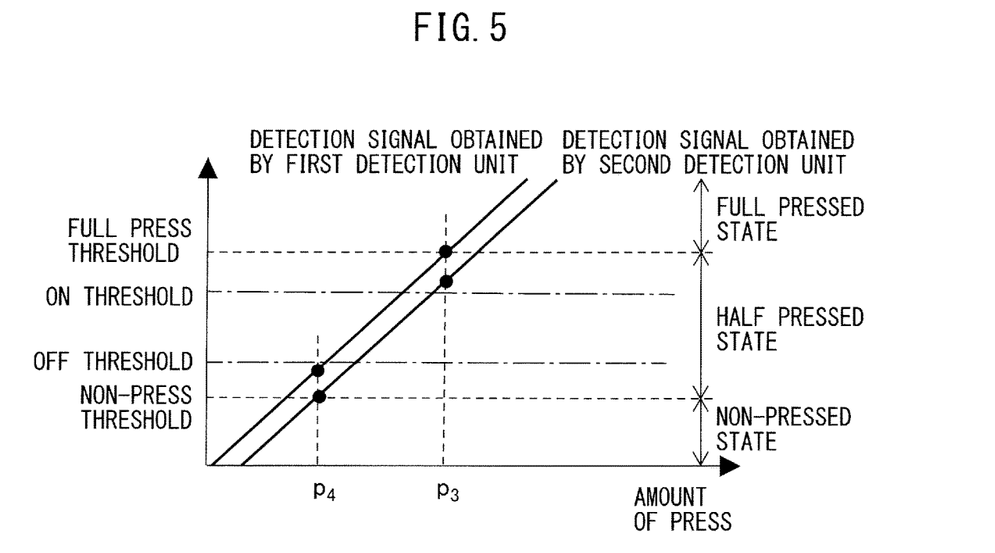
FIG. 5 is a graph for explaining output processing in the half pressed state of the switch operation unit by a first output unit and a second output unit.
Figure 6:
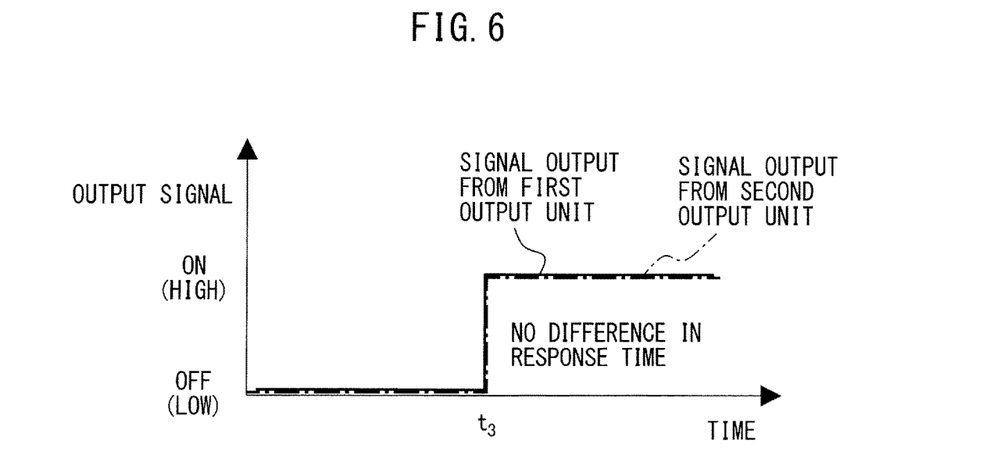
FIG. 6 is a chart illustrating an exemplary difference in response time between the first output unit and the second output unit when an ON signal is output in the half pressed state of the switch operation unit.
Figure 7:
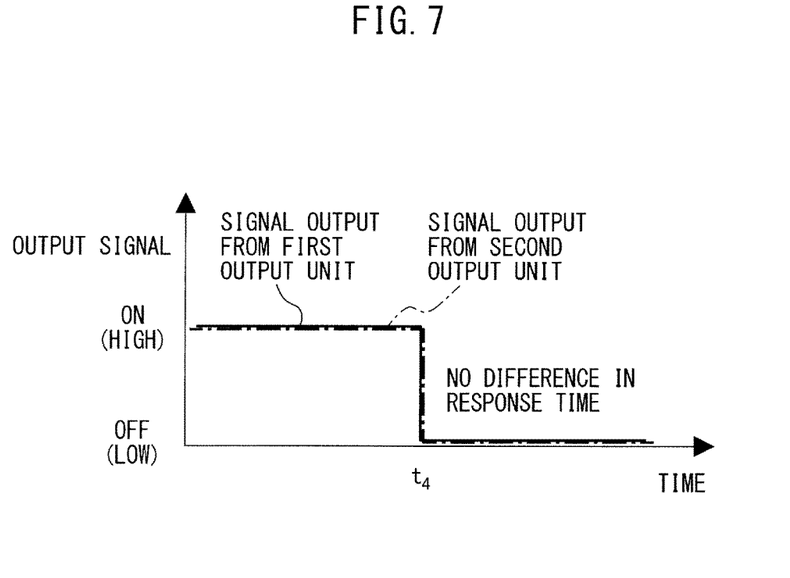
FIG. 7 is a chart illustrating an exemplary difference in response time between the first output unit and the second output unit when an OFF signal is output in the half pressed state of the switch operation unit.

FIG. 5 is a graph for explaining output processing in the half pressed state of the switch operation unit by a first output unit and a second output unit. FIG. 6 is a chart illustrating an exemplary difference in response time between the first output unit and the second output unit when an ON signal is output in the half pressed state of the switch operation unit. FIG. 7 is a chart illustrating an exemplary difference in response time between the first output unit and the second output unit when an OFF signal is output in the half pressed state of the switch operation unit.

As thresholds used to determine the magnitude of the detection signal obtained by each detection unit in each output unit when it is determined that the switch operation unit 11 is in a half pressed state, an ON threshold and an OFF threshold are set. The ON threshold is set to a value smaller than the full press threshold. The OFF threshold is set to a value smaller than the ON threshold and larger than the non-press threshold.

In the first ON/OFF signal generation unit 13-1, when the first determination unit 21-1 determines that the switch operation unit 11 is in a half pressed state, the first monitoring unit 22-1 monitors the pressed state of the switch operation unit 11 determined by the second determination unit 21-2 and notifies the first output unit 23-1 of the monitoring result. When the monitoring result obtained by the first monitoring unit 22-1 indicates that "the second determination unit 21-2 has determined that a full pressed state is maintained," the first output unit 23-1 determines whether the first detection signal output from the first detection unit 12-1 is equal to or larger than the ON threshold. When it is determined that the first detection signal is equal to or larger than the ON threshold, the first output unit 23-1 outputs an ON signal (high). In other words, the first output unit 23-1 outputs an ON signal in both cases where the first determination unit 21-1 determines that a full pressed state is maintained, and where, when the first determination unit 21-1 determines that a half pressed state is maintained, the first detection signal output from the first detection unit 12-1 is equal to or larger than the ON threshold and the monitoring result obtained by the first monitoring unit 22-1 indicates a full pressed state.

In addition, in the first ON/OFF signal generation unit 13-1, when the first determination unit 21-1 determines that the switch operation unit 11 is in a half pressed state, the first monitoring unit 22-1 monitors the pressed state of the switch operation unit 11 determined by the second determination unit 21-2 and notifies the first output unit 23-1 of the monitoring result. When the monitoring result obtained by the first monitoring unit 22-1 indicates that "the second determination unit 21-2 has determined that a non-pressed state is maintained," the first output unit 23-1 determines whether the first detection signal output from the first detection unit 12-1 is equal to or smaller than the OFF threshold. When it is determined that the first detection signal is equal to or smaller than the OFF threshold, the first output unit 23-1 outputs an OFF signal (low). In other words, the first output unit 23-1 outputs an OFF signal in both cases where the first determination unit 21-1 determines that a non-pressed state is maintained, and where, when the first determination unit 21-1 determines that a half pressed state is maintained, the first detection signal output from the first detection unit 12-1 is equal to or smaller than the OFF threshold and the monitoring result obtained by the first monitoring unit 22-1 indicates a non-pressed state.

Similarly, in the second ON/OFF signal generation unit 13-2, when the second determination unit 21-2 determines that the switch operation unit 11 is in a half pressed state, the second monitoring unit 22-2 monitors the pressed state of the switch operation unit 11 determined by the first determination unit 21-1 and notifies the second output unit 23-2 of the monitoring result. When the monitoring result obtained by the second monitoring unit 22-2 indicates that "the first determination unit 21-1 has determined that a full pressed state is maintained," the second output unit 23-2 determines whether the second detection signal output from the second detection unit 12-2 is equal to or larger than the ON threshold. When it is determined that the second detection signal is equal to or larger than the ON threshold, the second output unit 23-2 outputs an ON signal (high). In other words, the second output unit 23-2 outputs an ON signal in both cases where the second determination unit 21-2 determines that a full pressed state is maintained, and where, when the second determination unit 21-2 determines that a half pressed state is maintained, the second detection signal output from the second detection unit 12-2 is equal to or larger than the ON threshold and the monitoring result obtained by the second monitoring unit 22-2 indicates a full pressed state.

In addition, in the second ON/OFF signal generation unit 13-2, when the second determination unit 21-2 determines that the switch operation unit 11 is in a half pressed state, the second monitoring unit 22-2 monitors the pressed state of the switch operation unit 11 determined by the first determination unit 21-1 and notifies the second output unit 23-2 of the monitoring result. When the monitoring result obtained by the second monitoring unit 22-2 indicates that "the first determination unit 21-1 has determined that a non-pressed state is maintained," the second output unit 23-2 determines whether the second detection signal output from the second detection unit 12-2 is equal to or smaller than the OFF threshold. When it is determined that the second detection signal is equal to or smaller than the OFF threshold, the second output unit 23-2 outputs an OFF signal (low). In other words, the second output unit 23-2 outputs an OFF signal in both cases where the second determination unit 21-2 determines that a non-pressed state is maintained, and where, when the second determination unit 21-2 determines that a half pressed state is maintained, the second detection signal output from the second detection unit 12-2 is equal to or smaller than the OFF threshold and the monitoring result obtained by the second monitoring unit 22-2 indicates a non-pressed state.

The case where the first detection signal output from the first detection unit 12-1 is larger than the second detection signal output from the second detection unit 12-2 for the same amount of press of the switch operation unit 11, as illustrated in FIG. 5, will be taken as an example below. For an amount of press $p_3$ of the switch operation unit 11, since the first detection signal output from the first detection unit 12-1 is equal to or larger than the full press threshold, the first determination unit 21-1 in the first ON/OFF signal generation unit 13-1 determines that the switch operation unit 11 is in a full pressed state, and, therefore, the first output unit 23-1 outputs an ON signal (high) at time $t_3$, as illustrated in FIG. 6. In contrast to this, for the amount of press $p_3$ of the switch operation unit 11, since the second detection signal output from the second detection unit 12-2 is smaller than the full press threshold and equal to or larger than the non-press threshold, the second determination unit 21-2 in the second ON/OFF signal generation unit 13-2 determines that the switch operation unit 11 is in a half pressed state. In this case, the monitoring result obtained by the second monitoring unit 22-2 indicates that "the first determination unit 21-1 has determined that a full pressed state is maintained," as described above. Further, as illustrated in FIG. 5, for the amount of press $p_3$ of the switch operation unit 11, the second detection signal output from the second detection unit 12-2 is equal to or larger than the ON threshold. Hence, since "when the second determination unit 21-2 determines that the switch operation unit 11 is in a half pressed state, the second detection signal output from the second detection unit 12-2 is equal to or larger than the ON threshold and the monitoring result obtained by the second monitoring unit 22-2 indicates a full pressed state," the second output unit 23-2 outputs an ON signal (high). Since processing for outputting an ON signal from the second output unit 23-2 with the switch operation unit 11 in a half pressed state is performed based on "the monitoring result indicating that the first determination unit 21-1 has determined that a full pressed state is maintained" obtained by the second monitoring unit 22-2, and the fact that "the second detection signal output from the second detection unit 12-2 for the same amount of press $p_3$ is equal to or larger than the ON threshold," the timing at which an ON signal (high) is output from the second output unit 23-2 coincides with that at which an ON signal (high) is output from the first output unit 23-1 (time $t_3$), resulting in no difference in response time, as illustrated in FIG. 6.

In addition, for example, as illustrated in FIG. 5, for an amount of press $p_4$ of the switch operation unit 11, since the second detection signal output from the second detection unit 12-2 is equal to or smaller than the non-press threshold, the second determination unit 21-2 in the second ON/OFF signal generation unit 13-2 determines that the switch operation unit 11 is in a non-pressed state, and, therefore, the second output unit 23-2 outputs an OFF signal (low) at time $t_4$, as illustrated in FIG. 7. In contrast to this, for the amount of press $p_4$ of the switch operation unit 11, since the first detection signal output from the first detection unit 12-1 is smaller than the full press threshold and equal to or larger than the non-press threshold, the first determination unit 21-1 in the first ON/OFF signal generation unit 13-1 determines that the switch operation unit 11 is in a half pressed state. In this case, the monitoring result obtained by the first monitoring unit 22-1 indicates that "the second determination unit 21-2 has determined that a non-pressed state is maintained," as described above. The first output unit 23-1 determines whether the first detection signal output from the first detection unit 12-1 is equal to or smaller than the OFF threshold. Further, as illustrated in FIG. 5, for the amount of press $p_4$ of the switch operation unit 11, the first detection signal output from the first detection unit 12-1 is equal to or smaller than the OFF threshold. Hence, since "when the first determination unit 21-1 determines that the switch operation unit 11 is in a half pressed state, the first detection signal output from the first detection unit 12-1 is equal to or smaller than the OFF threshold and the monitoring result obtained by the first monitoring unit 22-1 indicates a non-pressed state," the first output unit 23-1 outputs an OFF signal (low). Since processing for outputting an OFF signal from the first output unit 23-1 with the switch operation unit 11 in a half pressed state is performed based on "the monitoring result indicating that the second determination unit 21-2 has determined that a non-pressed state is maintained" obtained by the first monitoring unit 22-1, and the fact that "the first detection signal output from the first detection unit 12-1 for the same amount of press $p_4$ is equal to or smaller than the OFF threshold," the timing at which an OFF signal (low) is output from the first output unit 23-1 coincides with that at which an OFF signal (low) is output from the second output unit 23-2 (time $t_4$), resulting in no difference in response time, as illustrated in FIG. 7.

As described above, according to this embodiment, in the first ON/OFF signal generation unit 13-1 and the second ON/OFF signal generation unit 13-2, in the case where the determination unit in any given ON/OFF signal generation unit determines that a full pressed state is maintained, and in the case where, when the determination unit in the given ON/OFF signal generation unit determines that a half pressed state is maintained, the detection signal output from the detection unit corresponding to the given ON/OFF signal generation unit is equal to or larger than the ON threshold and the monitoring result for the determination unit in the ON/OFF signal generation unit different from the given ON/OFF signal generation unit obtained by the monitoring unit indicates a full pressed state, the output unit in the given ON/OFF signal generation unit outputs an ON signal. In addition, in the first ON/OFF signal generation unit 13-1 and the second ON/OFF signal generation unit 13-2, in the case where the determination unit in any given ON/OFF signal generation unit determines that a non-pressed state is maintained, and in the case where, when the determination unit in the given ON/OFF signal generation unit determines that a half pressed state is maintained, the detection signal output from the detection unit corresponding to the given ON/OFF signal generation unit is equal to or smaller than the OFF threshold and the monitoring result for the determination unit in the ON/OFF signal generation unit different from the given ON/OFF signal generation unit obtained by the monitoring unit indicates a non-pressed state, the output unit in the given ON/OFF signal generation unit outputs an OFF signal. According to this embodiment, regardless of the structure of the switch operation unit 11, or the differences in characteristic between the first detection unit 12-1 and the second detection unit 12-2, and the structural differences between the respective detection units in the switch device 1, such as the difference between the distance between the switch operation unit 11 and the first detection unit 12-1 and the distance between the switch operation unit 11 and the second detection unit 12-2, no difference occurs in response time between the first ON/OFF signal generation unit 13-1 and the second ON/OFF signal generation unit 13-2, and the timing at which switching is made from an ON signal (high) to an OFF signal (low) and that at which switching is made from an OFF signal (low) to an ON signal (high) coincide with each other between the respective output signals. Hence, the numerical control device 2 that receives, as safety input signals for monitoring the safety function of a machine tool, the signals output from the first ON/OFF signal generation unit 13-1 and the second ON/OFF signal generation unit 13-2 does not regard a normal machine tool as abnormal due to erroneous determination.

When both the first determination unit 21-1 in the first ON/OFF signal generation unit 13-1 and the second determination unit 21-2 in the second ON/OFF signal generation unit 13-2 determine that the switch operation unit 11 is in a half pressed state, the first output unit 23-1 and the second output unit 23-2 may, for example, continuously output the current output signals, or may, for example, output signals (i.e., one of an ON signal and an OFF signal) for ensuring the safety of the machine tool.

Figure 8:
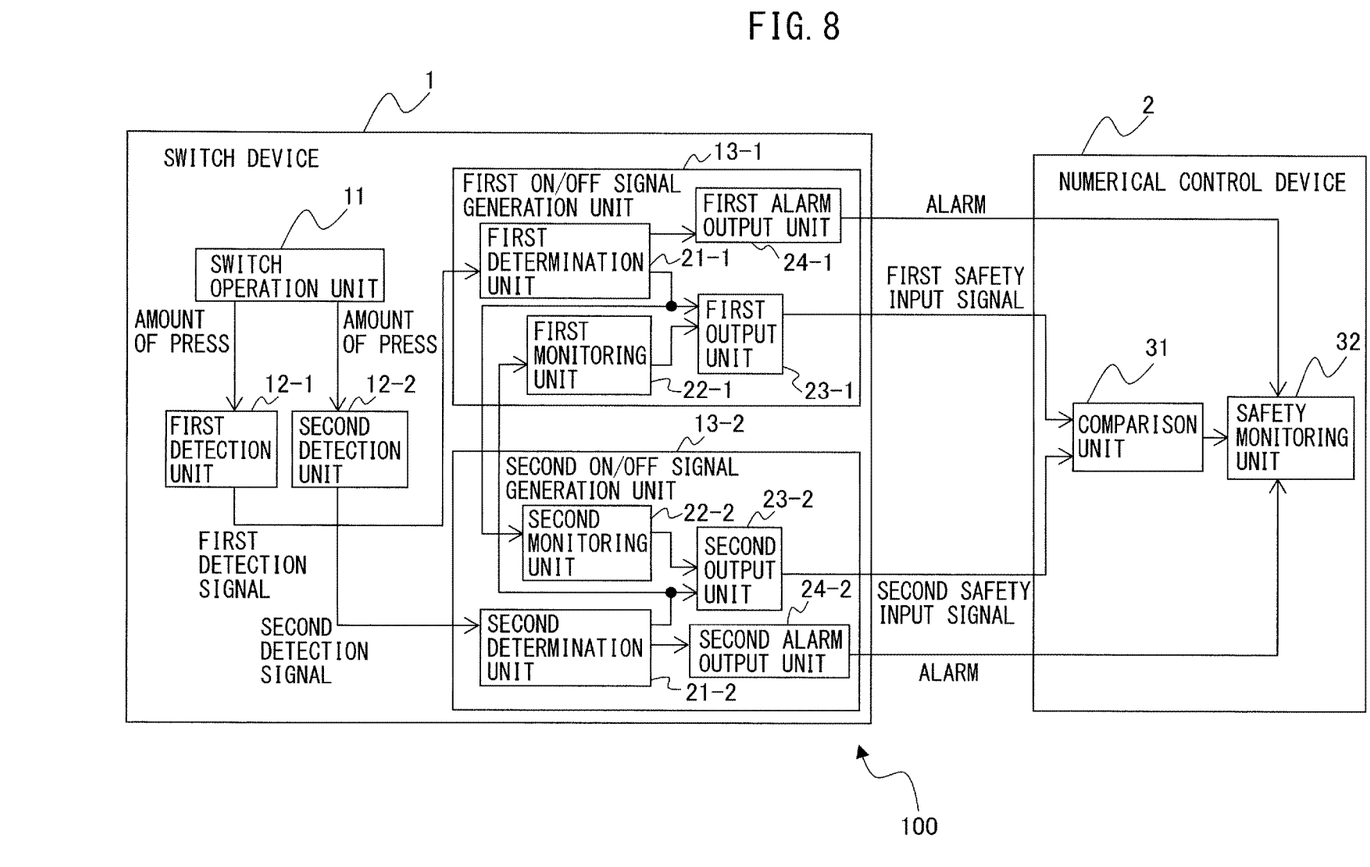
FIG. 8 is a block diagram illustrating a switch device and a numerical control system according to another embodiment.

A switch device and a numerical control system according to another embodiment will be described next. FIG. 8 is a block diagram illustrating a switch device and a numerical control system according to another embodiment.

A switch device 1 according to the other embodiment is obtained by providing a first alarm output unit 24-1 and a second alarm output unit 24-2 in the first ON/OFF signal generation unit 13-1 and the second ON/OFF signal generation unit 13-2, respectively, described with reference to FIGS. 1 to 7. The first alarm output unit 24-1 in the first ON/OFF signal generation unit 13-1 outputs an alarm when the first determination unit 21-1 continuously determines that a half pressed state is maintained for a predetermined time or more. The second alarm output unit 24-2 in the second ON/OFF signal generation unit 13-2 outputs an alarm when the second determination unit 21-2 continuously determines that a half pressed state is maintained for a predetermined time or more. An alarm is output when it is continuously determined that a half pressed state is maintained for a predetermined time or more in this manner, because the switch device 1 (e.g., the switch operation unit 11, the first detection unit 12-1, or the second detection unit 12-2) may have broken down. In the other embodiment, to more reliably ensure the safety of a machine tool, when either the first determination unit 21-1 or the second determination unit 21-2 continuously determines that the switch operation unit 11 is in a half pressed state for a predetermined time or more, the alarm output unit notifies the safety monitoring unit 32 in the numerical control device 2 of an alarm. In response to the alarm, the numerical control device 2 can perform an operation for ensuring the safety and can even notify the operator of a breakdown of the switch device 1 via, e.g., a monitor of the numerical control device 2. Since other components are the same as those illustrated in FIG. 1, the same reference numerals denote the same components, and a detailed description thereof will not be given.

The above-mentioned first ON/OFF signal generation unit 13-1 and second ON/OFF signal generation unit 13-2 may be constructed in, e.g., software program form, or constructed as a combination of various electronic circuits and a software program. In this case, the function of each unit can be implemented by causing an arithmetic processing unit in, e.g., the switch device 1 to operate the software program. Alternatively, the function of each unit may be implemented as a semiconductor integrated circuit in which a software program for implementing the functions of the first ON/OFF signal generation unit 13-1 and the second ON/OFF signal generation unit 13-2 is written, and the switch device 1 may be formed by combining the semiconductor integrated circuit with the switch operation unit 11, the first detection unit 12-1, and the second detection unit 12-2.

One aspect of the present disclosure can implement a switch device which generates a safety input signal to be input to a numerical control device to accurately monitor the safety function of a machine tool, and a numerical control system including the same.

The invention claimed is:

1. A switch device comprising:
   a press operation type switch operation unit;
   two detection units configured to convert an amount of press of the switch operation unit into electrical detection signals and output the detection signals; and two ON/OFF signal generation units provided in correspondence with the respective detection units, each of the ON/OFF signal generation units comprising a determination unit configured to determine whether the switch operation unit is in a full pressed state, a half pressed state, or a non-pressed state, based on the detection signal output from the detection unit corresponding to the each of the ON/OFF signal generation units, a monitoring unit configured to monitor a pressed state determined by the determination unit in the ON/OFF signal generation unit different from the each of the ON/OFF signal generation units, and an output unit configured to output one of an ON signal and an OFF signal, wherein each of the output units outputs the ON signal in a case where the determination unit in the ON/OFF signal generation unit equipped with the each of the output units determines that the full pressed state is maintained, and in a case where, when the determination unit in the ON/OFF signal generation unit equipped with the each of the output units determines that the half pressed state is maintained, the detection signal output from the detection unit corresponding to the ON/OFF signal generation unit equipped with the each of the output units is not less than an ON threshold and a monitoring result obtained by the monitoring unit indicates the full pressed state, and outputs the OFF signal in a case where the determination unit in the ON/OFF signal generation unit equipped with the each of the output units determines that the non-pressed state is maintained, and in a case where, when the determination unit in the ON/OFF signal generation unit equipped with the each of the output units determines that the half pressed state is maintained, the detection signal output from the detection unit corresponding to the ON/OFF signal generation unit equipped with the each of the output units is not more than an OFF threshold and a monitoring result obtained by the monitoring unit indicates the non-pressed state.

2. The switch device according to claim 1, wherein each of the determination units determines that the full pressed state is maintained when a magnitude of the detection signal output from the detection unit corresponding to the ON/OFF signal generation unit equipped with the each of the determination units is not less than a certain full press threshold, that the non-pressed state is maintained when the magnitude is not more than a certain non-press threshold, and that the half pressed state is maintained when the magnitude is smaller than the full press threshold and larger than the non-press threshold.

3. The switch device according to claim 2, wherein the ON threshold is set to a value smaller than the full press threshold, and the OFF threshold is set to a value smaller than the ON threshold and larger than the non-press threshold.

4. The switch device according to claim 1, wherein each of the ON/OFF signal generation units further comprises an alarm output unit configured to output an alarm when the determination unit in the each of the ON/OFF signal generation units continuously determines that the half pressed state is maintained for not less than a predetermined time.

5. A numerical control system comprising:

the switch device according to claim 1; and a numerical control device configured to receive, as safety input signals for monitoring a safety function of a machine tool, an ON signal and an OFF signal output from the output unit of each of the ON/OFF signal generation units, the numerical control device comprising:

a comparison unit configured to compare the two safety input signals input from the respective ON/OFF signal generation units; and a safety monitoring unit configured to determine, as a result of comparison by the comparison unit, that the machine tool is normal when both of the two safety input signals are one of the ON signal and the OFF signal, and that the machine tool is abnormal when one of the two safety input signals is the ON signal and the other of the two safety input signals is the OFF signal.

* * * * *